Sept. 24, 1963
M. T. KENNEDY, JR  3,104,896
PIPE COUPLING WITH INTERMESHING TEETH AND
COMBINED CAMMING AND LOCKING KEY
Filed July 14, 1960
3 Sheets-Sheet 1
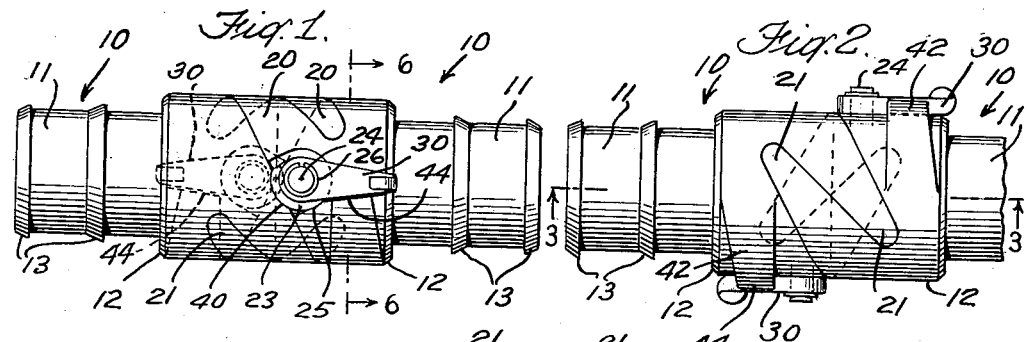
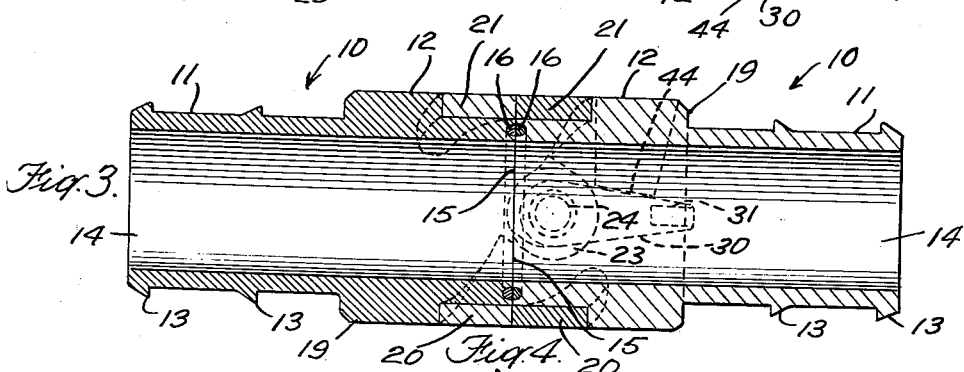
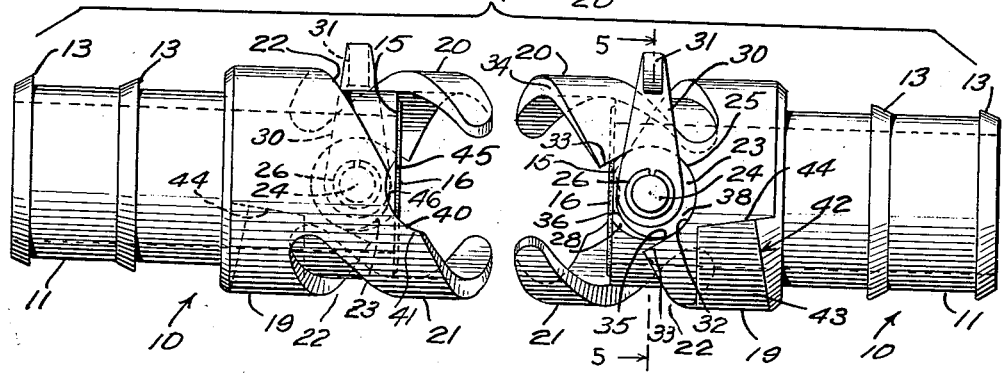
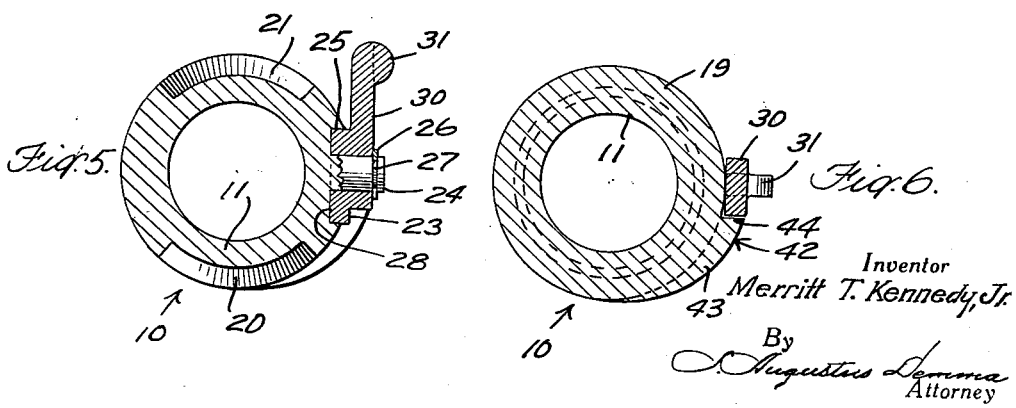
Inventor
Merritt T. Kennedy, Jr.
By
Augustus Lemma
Attorney Sept. 24, 1963       M. T. KENNEDY, JR       3,104,896
    PIPE COUPLING WITH INTERMESHING TEETH AND
        COMBINED CAMMING AND LOCKING KEY
Filed July 14, 1960                    3 Sheets-Sheet 2

Inventor
Merritt T. Kennedy, Jr.
By
Augustus Lemma
Attorney

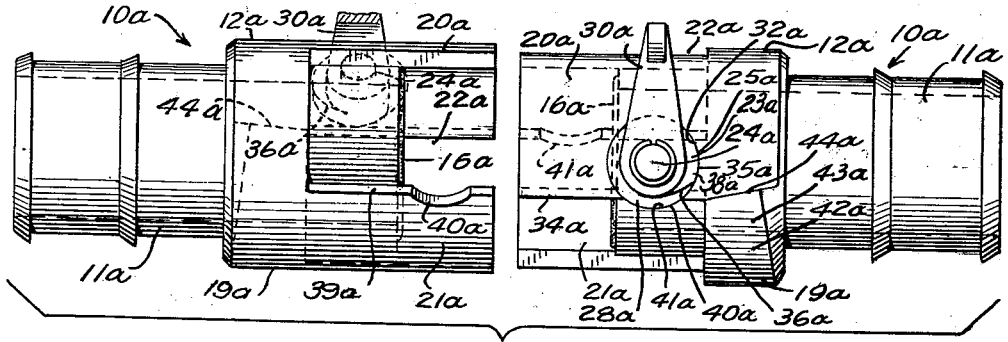

United States Patent Office 3,104,896
Patented Sept. 24, 1963

3,104,896
PIPE COUPLING WITH INTERMESHING TEETH AND COMBINED CAMMING AND LOCKING KEY
Merritt T. Kennedy, Jr., 15 Lowell Road, Port Washington, N.Y.
Filed July 14, 1960, Ser. No. 42,891
1 Claim. (Cl. 285—18)

The present invention relates to pipe couplings for connecting lengths of pipes together.

One object of the present invention is to provide a new and improved pipe coupling, which combines simplicity, cheapness, structural strength and durability, which may be quickly connected to form a fluid-tight joint and just as quickly disconnected, which consists of two identical interchangeable companion sections, each of which has its components assembled and mounted against detachment into a self-contained unit, and which when connected will be safe against accidental disconnection.

In accordance with certain features of the present invention, the two coupling sections are not of the male and female type but are identical, thereby simplifying manufacture and making it easy to couple sections without trying to match dissimilar sections. Each of these coupling sections comprises a plurality of teeth or lugs projecting from the nipple of the section and circumferentially spaced around said nipple to mesh with the corresponding teeth of the companion section when the two sections are brought together. Each of these sections carries a rotatable key and a keyway, these being arranged so that when the coupling sections are fully meshed, the key on one section is in position directly opposite and adjoining the keyway on the other section. The key is designed and mounted, so that while the coupling sections are being brought together into mesh, this key is in retracted position and therefore does not interfere with these relative meshing movements of the coupling sections, and while the coupling sections are in mesh, the key of one section can be rotated into position to project into the companion keyway of the other section, to lock the two sections together against separation.

The two coupling sections have respective projecting gaskets, which when the sections are brought together preparatory to locking them against separation, come into face to face contact. Under these conditions, the coupling sections may not be in full mesh because of the resistance offered by the confronting gaskets. As a feature of the present invention, the key on each coupling section has a cam conformation, which as the key is turned from inoperative position into the keyway in the other coupling section for locking action, cams the two coupling sections towards each other into full mesh and compresses thereby the confronting gaskets, to form a fluid-tight connection therebetween. The cam keys are designed so that the two coupling sections cannot be separated without turning the keys manually back to inoperative positions.

In accordance with one specific embodiment of the invention, the lugs or teeth of each coupling section extend helically around the nipple of said section, so that the two sections are connected by screwing the sections together relatively in one rotative direction and are cammed and locked together against unscrewing rotative movements by the cam keys turned into keying positions. The cam keys are designed, so that in this embodiment, any tendency for the coupling sections to become unscrewed entrenches the keys more firmly into the companion keyways.

In accordance with another specific embodiment of the invention, the lugs or teeth of each coupling section extend lengthwise of the section, so that the two sections are brought into mesh by merely pushing them axially relatively towards each other. When so meshed, the coupling sections are locked by the lugs or teeth against relative rotation in either direction, and are cammed and locked together against relative axial separating movement by the keys turned into keying positions. The cam keys are designed, so that in this embodiment, any tendency for the sections to pull apart axially entrenches the keys more firmly into the respective keyways to resist such tendency.

Various other objects, features and advantages of the invention are apparent from the following description and from the accompanying drawings, in which FIG. 1 is a side elevation of a pipe coupling constituting one embodiment of the present invention and shown in connected position with the keys turned into locking position;

FIG. 2 is a bottom plan view of the connected pipe coupling shown in FIG. 1;

FIG. 3 is an axial section of the connected pipe coupling taken on lines 3—3 of FIG. 2 but shown on a larger scale;

FIG. 4 is an exploded side elevational view of the pipe coupling showing its two coupling sections axially separated from connected position, and its keys in retracted unlocking position and showing said coupling sections in the same relative rotative position they would assume in connected position;

FIG. 5 is a transverse section of the coupling section taken on lines 5—5 of FIG. 4 and showing its key in unlocking position;

FIG. 6 is a transverse section of the coupling section taken on lines 6—6 of FIG. 1 but on a larger scale, and showing its key in locking position;

FIG. 12 is a side elevation of a pipe coupling constituting still another embodiment of the present invention, the sections of the coupling being shown in axially separated positions just prior to be moved into mesh;

FIG. 13 is a side elevation of the pipe coupling shown in FIG. 12 after the sections of the coupling have been moved into mesh and after the keys have been moved into locking position;

FIG. 14 is a transverse section of the pipe coupling taken on lines 14—14 of FIG. 13; and FIG. 15 is a perspective of one of the coupling sections shown in FIG. 12.

Figure 7:
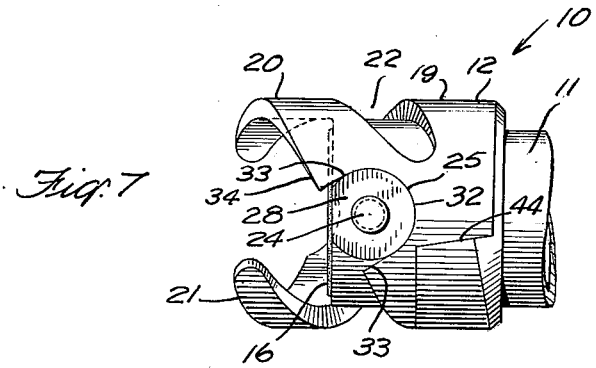
FIG. 7 is a side elevation of one of the coupling sections shown in FIG. 1, but shown without the key mounted thereon.

Referring to the form of invention illustrated in FIGS. 1–10, the pipe coupling is shown consisting of two identical coupling sections 10, each having a nipple 11 to which a flexible hose may be connected and a coupling head 12 by which the two sections may be secured together. The nipple 11 is shown formed with a pair of ring flanges 13 for anchoring a hose thereon. However, the invention is not limited to a coupling for connecting lengths of hose together, but is adaptable for the connection of lengths of tubes of any suitable form.

The nipple 11 has a cylindrical bore 14 (FIG. 3) and when the two coupling sections are connected and locked together, and confronting ends 15 (FIGS. 3a and 4) of the nipples come together to define through the assembled coupling a continuous uniform passageway. To render the union between the two coupling sections fluid-tight, the end 15 of each coupling section 10 has an annular recess to receive a gasket 16, which projects outwardly from said end when the coupling is disconnected as shown in FIG. 4, and which has sufficient resiliency to permit the two confronting gaskets to be compressed and the confronting ends of the nipples to come into contact or almost into contact, when the coupling is connected, as shown in FIG. 3. For that purpose, the gaskets may be of any suitable material, depending on the character of the fluid to be conveyed, and may, for example, be of neoprene.

The coupling head 12 in the embodiment of the invention shown in FIGS. 1–10 constitutes a peripheral embossment of the nipple 11 and comprises a collar 19 formed integral with and extending around the nipple and a series of teeth or lugs 20 and 21 separated by spaces 22 and emerging from said collar, said teeth projecting forwardly beyond the end 15 of the nipple. The interdental spaces 22 correspond in width and shape to the width of the teeth to permit the teeth 20 and 21 of the two coupling sections to mesh snugly, conformably and easily when brought together and locked in the manner to be described.

In the specific embodiment of the invention shown in FIGS. 1–10, the teeth 20 and 21 extend helically around the nipple 11 so that the two coupling sections 10 can be brought into mesh by screwing them together. To permit the coupling sections 10 to be brought into mesh by natural rotatable manipulation of said sections, the teeth 20 and 21 preferably extend helically in a direction to permit the coupling sections to be brought into mesh by a right-hand turn of the right-hand coupling section and/ or a left-hand turn of the left-hand coupling section. A simple twist of the wrists in proper opposite directions will bring the coupling sections 10 into full mesh.

In a specific form of the invention shown in FIGS. 1–10, each coupling section 10 has two teeth 20 and 21, which are identical except for certain recess formations therein to receive the locking device to be described, and which are 180° apart. The teeth 20 and 21 taper towards their outer ends and the interdental spaces 22 are correspondingly tapered to facilitate the bringing of the coupling sections into snug mesh.

During assembly, the two coupling sections 10 are brought and screwed together until the gaskets 16 on the two coupling sections are in face contact. The resistance offered by the projecting gaskets 16 prevents or makes it difficult for the coupling sections 10 to be turned manually into full mesh. To cam the partially meshed coupling sections 10 together into full mesh and to lock the fully meshed coupling sections against unscrewing separation, there is provided on each coupling section a locking cam device adapted when moved into engagement with the other coupling section, to cam the coupling sections together into full mesh and to lock the coupling sections in full mesh against separation. This locking cam device comprises a rotary cam key 23 supported on a post 24 extending radially from the corresponding nipple wall. This post 24 is desirably integral with the nipple wall, although as far as certain aspects of the invention are concerned, it may be rigidly connected thereto in any suitable manner, and serves as a bearing for the key 23. A recess 25 in the tooth 20 forms a clearing for the bearing post 24 and receives therein the key 23. The key 23 in the form of a disc embraces the post 24 with a snug rotative fit, and is retained thereon by a split snap ring 26 fitted into a recess 27 (FIG. 5) near the outer end of the post, and the recess 25 desirably extends partly into the wall of the nipple 11 to present a flat base 28 as a seat for the key 23. A handle 30 is desirably integral at one end with the key 23 although it may be connected thereto in any other suitable way, and terminates at its outer end in a finger piece 31.

The peripheral wall of the key recess 25 is contoured with an arcuate section 32 (FIG. 7) of about 180°, centered about the axis of the post 24 and with a pair of substantially straight parallel side sections 33 extending tangentially to opposite sides of said arcuate section and reaching to the outer edge 34 of the tooth 20, so that said recess is open at said outer edge of the tooth. The key 23 is peripherally contoured for camming and locking action with a circular side 35 also centered about the axis of the post 24 and having a radius corresponding to the radius of the arcuate wall section 32 of the key recess 25 and an opposite truncated side 36. The truncated side 36 of the key 23 may be of circular contour but with its center offset from the center of the circular side 35 and is so designed and located that when the key and the handle 30 therefor are in inoperative position shown in FIG. 9, this side 36 of the key extends generally along the outer edge 34 of the tooth 20 and just inside said outer tooth edge, so that no part of the key projects outwardly beyond said tooth edge. In this inoperative position of the key 23, the coupling sections 10 may be rotatively slid into mesh without interference from the key until the two gaskets 16 come into contact. Since the resistance of the contacting gaskets 16 may prevent the coupling sections 10 from being manually turned relatively into full mesh, the coupling sections may be in relative rotative positions just short of full mesh. FIG. 9 shows the two coupling sections 10 in full mesh just prior to the turning of the cam keys 23 into locking position in order to prevent undue complications in the drawings, but in actual practice, the gaskets 16 would have prevented or at least would have made it difficult to turn the coupling sections manually into full mesh. When the key 23 of one coupling section 10 is turned about 90° clockwise from the inoperative position shown in FIG. 9 to the locking postion shown in FIG. 8, the substantially chordal section 38 of the key 23 along a part of the circular side 35 of the key moves into position to project outwardly from the outer edge 34 of the tooth 20 and into engagement with the tooth 21 on the other coupling section 10 to cam the coupling sections together into full mesh and to lock the fully meshed coupling sections against separation.

Figure 8:
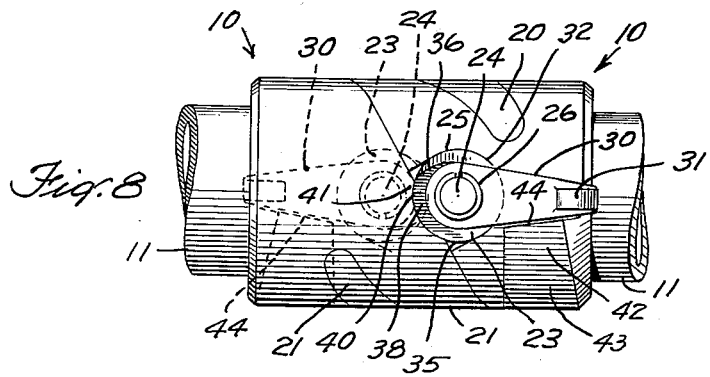
FIG. 8 is a fragmentary side elevation of the pipe coupling similar to that shown in FIG. 1, but on a larger scale, and showing the coupling in mesh and after being locked by the keys.
Figure 9:
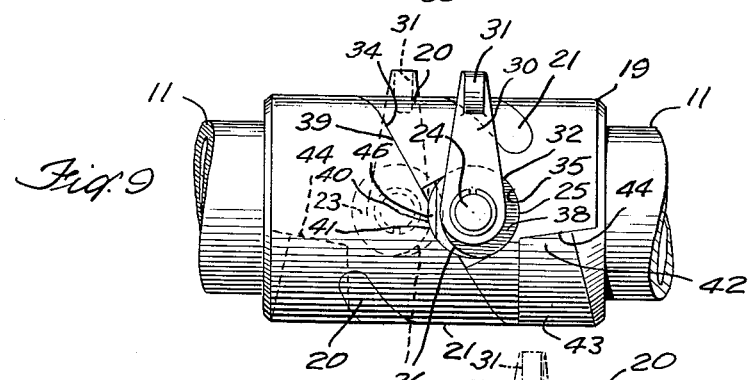
FIG. 9 is a side elevation of the meshed pipe coupling similar to that illustrated in FIG. 8, but showing the keys in released or unlocking position.
Figure 10:
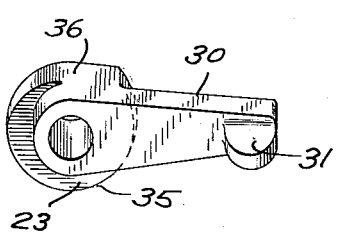
FIG. 10 is a perspective of the key with its connected operating handle.

To cam and interlock the coupling sections 10 through the keys 23 in the manner described, each tooth 21 has a keyway 40 extending from its outer edge 39 and provided with an arcuate wall 41 having a radius equal to the radius of the arcuate wall section 32 of the recess 25 and to the circular side 35 of the key 23 and centered about the axis of the post 24 when the two coupling sections are in full mesh, as shown in FIG. 8 to follow the circle of said wall section 32 and said key side 35. This keyway 40 defines the minor part of this circle and is wide enough to receive snugly and conformably therein the projectable section 38 of the key 23 when the key is in locking position shown in FIGS. 1, 2, 3, and 8. In this locking position, the two handles 30 extend along the length of the coupling and the two coupling sections 10 are interlocked by the intermesh of the teeth 20 and 21 of the two coupling sections against axial separation and are interlocked by the two keys 23 against relative rotation tending to unscrew the coupling sections.

Since the two coupling sections 10 very likely are not in full mesh just prior to the turning of the cam keys 23 into locking positions, the keyways 40 will not be centered with respect to the corresponding key recesses 25 but will be slightly offset therefrom, but as the keys are turned towards said locking positions, the circular sides 35 of the keys extending into said keyways, move progressively into conforming contact with the walls 41 of said keyways, causing said coupling sections 10 to be cammed rotatively and relatively into full mesh and the keyways to move thereby into centered position with respect to their respective key recesses, as shown in FIG. 8.

Since the relative rotation of the fully meshed and locked coupling sections 10 tending to unscrew and disconnect them urges both keys 23 rotatively clockwise for the front key shown in full lines in FIG. 8, and counterclockwise for the rear key shown in dotted lines in FIG. 8, a stop 42 is provided for each key 23 comprising a spiral boss 43 on the corresponding collar 19 terminating in a shoulder 44 along the length of the coupling. In locking position of each key 23, the corresponding handle 30 engages this shoulder 44 and is stopped in this position, and any tendency to turn the coupling sections 10 relatively in disconnecting directions due to the pressure in the coupling, or to the resiliency of the compressed gaskets 16 or to any other cause, only serves to turn the key in a direction to become more firmly entrenched in its keyway 40 and to press the corresponding handle 30 with greater pressure against the stop shoulder 44.

Since the recess 25 in one coupling section 10 retaining the major portion of the corresponding key 23 extends into the wall of the nipple 11 of said section to provide a flat seat 28 for the key 23, the keyway 40 on the other coupling section 10 also extends partly into the wall of the nipple 11 of the latter section to present a flat seat 45 flush with the flat seat 28, when the two coupling sections are in full mesh.

During the rotational transition of each key 23 from released position shown in FIG. 9 to locking position shown in FIG. 8, the arcuate wall section 32 of the recess 25 serving as a peripheral bearing for the circular side 35 of the key and the post 24 serving as a center bearing for this key, guide the key smoothly and stably into locking position. In this locking position, a substantial part of the circular side 35 of the key 23 is still in conforming engagement with the arcuate wall section 32 of the recess 25, so that this key with the assistance of the corresponding stop shoulder 44 firmly retains the coupling sections 10 in interlocked positions.

In the operation of securing the coupling sections 10 together, these sections are aligned with their respective keys 23 on the same side of the sections and in angular positions so that their handles 30 extend generally in the planes at right angles to the axes of the sections. The coupling sections 10 in this position are then screwed and brought together, until the gaskets 16 of the two sections meet. When so manually brought together, the coupling sections 10 will be approximately in the relative positions shown in FIG. 9, except that they will be just short of full mesh due to the resistance against compression offered by the resilient contacting gaskets 16. In this position of the coupling sections 10 the centers of the two keys 23 will be just short of being in diametrical opposite positions. The handles 30 are then turned into positions along the coupling sections 10 and against the stop shoulders 44, causing the keys 23 to project into the respective keyways 40, and to move progressively into conforming contacts with the walls 41 of the keyways, thereby camming the coupling sections into full mesh and locking the fully meshed coupling sections against separation in any direction, as shown in FIGS. 1, 2, 3 and 8. During the camming of the coupling sections 10 into full mesh, the gaskets 16 are compressed into fluid tight conformance. After being key-locked as described, the only way the coupling sections 10 can be disconnected is by turning the handles 30 back into the released position shown in FIG. 9.

Figure 11:
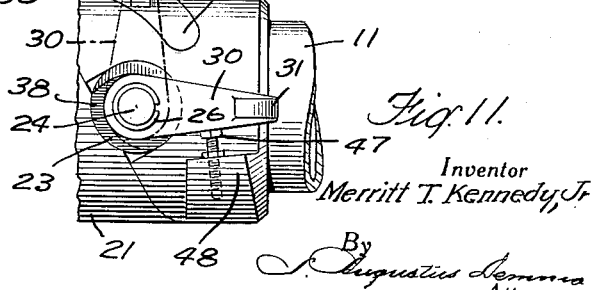
FIG. 11 is a fragmentary side elevational view of a connected and locked pipe coupling constituting another embodiment of the present invention.

FIG. 11 shows a modification in which wear on each key 23 is compensated for by adjustments. To that end, the handle 30 on the key 23 instead of bearing against a stop shoulder, such as the stop shoulder 44 in the construction of FIGS. 1–10, bears against the head of an adjusting stud 47, adjustably threaded into the end of a spiral boss 48. As the projectable section 38 of the key 23 becomes worn, the stud 47 is screwed further into the boss 48 to adjust the locking position of the key and to bring a new unworn section of the circular segment of the key into the keyway 40.

FIGS. 12–15 show an embodiment of the invention in which the teeth or lugs of each coupling section extend lengthwise of the section, so that the two sections are meshed by merely pushing them axially relatively towards each other. In this construction, the coupling sections 10a are identical and interchangeable, and each has a nipple 11a with a gasket 16a at its outer end and a coupling head 12a by which the two coupling sections may be secured together. The coupling head 12a in the form of a peripheral embossment of the nipple 11a comprises a collar 19a formed integral with and extending around the nipple and a series of teeth or lugs 20a and 21a separated by spaces 22a and emerging from said collar. These teeth 20a and 21a are longitudinal segments of a cylinder, two being shown on each coupling section spaced substantially diametrically apart, the circumferential lengths of these teeth corresponding to the circumferential lengths respectively of the interdental spaces 22a to permit the two coupling sections 10a to be snugly and conformably meshed against relative rotation in either direction by merely moving these coupling sections towards each other when in axial alignment and when in the proper relative rotative positions. In the specific form of the invention illustrated, each of the teeth 20a and 21a extends through an arc of 90° and each of the interdental spaces 22a is also of 90° circumferential width, and the length of the teeth corresponds to the length of the spaces.

The locking cam device for each coupling section 10a comprises a rotary cam key 23a and a handle 30a therefor, similar to the key 23 and handle 30 in the construction of FIGS. 1–10, except for the angular relationship between the key and the handle, and similarly supported on a post 24a extending from the wall of the nipple 11a. A recess 25a in the tooth 20a reaching to the edge 34a of the tooth forms a clearing for the bearing post 24a and desirably extends partly into the wall of the corresponding nipple 11a to present a flat base 28a as a seat for the key 23a. The contour of the peripheral wall 32a of the key recess 25a constitutes a major segment of a circle centered about the axis of the post 24a and the key 23a is peripherally contoured with a circular side 35a also centered about the axis of the post and having a radius corresponding to that of the recess wall section 32a and an opposite truncated side 36a. The truncated side 36a of the key 23a is so designed and located that when the key and the handle 30a therefor are in inoperative position shown in FIG. 12, this side of the key extends generally along the longitudinal edge 34a of the tooth 20a and just inside said tooth edge, so that no part of the key projects outwardly beyond said tooth edge. In this inoperative position of the key 23a, the coupling sections 10a may be slid axially into mesh without interference from the key. As in the construction of FIGS. 1–10, the resistance offered by the contacting gaskets 16a against compression makes it difficult to bring the coupling sections 10a relatively axially together into full mesh, but the coupling sections can be brought together short of full mesh. When the key 23a of one coupling section is turned about 90° clockwise from the inoperative position shown in FIG. 12 to the locking position shown in FIGS. 13 and 14, the chordal section 38a of the key 23a along a part of the circular side 35a of the key moves into position to project outwardly from the longitudinal edge 34a of the tooth 20a and into engagement with the tooth 21a on the other coupling section 10a to cam the coupling sections axially together into full mesh and to lock the fully meshed coupling sections against axial separation.

To cam and interlock the coupling sections 10a through the keys 23a against axial separation, each tooth 21a has a keyway 40a extending from its longitudinal edge 39a and provided with an arcuate wall 41a having a radius equal to the radius of the arcuate wall section 32a of the recess 25a and to the circular side 35a of the key 23a and centered about the axis of the post 24a when the two coupling sections are in full mesh, as shown in FIG. 13, to follow the circular contour of said wall section 32a and said key side 35a. The contours of the keyways 40a and the recess 25a in this meshed condition of the coupling sections 10a conjointly form a circle and the keyway 40a is therefore wide enough to receive snugly and conformably therein the projectable section 38a of the key 23a when the key is in the locking position, shown in FIGS. 13 and 14.

The two coupling sections 10a very likely are not in full mesh just prior to the turning of the cam keys 23a into locking positions for the reasons indicated above, but as the keys are turned towards locking position, the circular sides 35a of the keys extending into the respective keyways 40a move progressively into conforming contact with the walls 41a of said keyways, causing said coupling sections to be cammed axially into full mesh. This camming action compresses the gaskets 16a until the confronting ends of the nipples 11a come into contact or almost into contact and produces a fluid-tight connection between the gaskets.

In locking position, the two handles 30a extend along the length of the coupling sections 10a and the two coupling sections 10a are interlocked against relative rotation in either direction by the intermesh of the teeth 20a and 21a of the two coupling sections and are interlocked against axial separation by the two keys 23a. Any tendency to separate the coupling sections 10a in this locked condition urges the key 23a rotatively (clockwise for the front key shown in full lines in FIG. 13 and counterclockwise for the rear key shown in dotted lines in FIG. 13). To limit this rotation of the keys 23a, each of the coupling sections 10a has a stop 42a comprising a spiral boss 43a on the corresponding collar 19a terminating in a shoulder 44a along the length of the coupling. In locking position of each key 23a, the corresponding handle 30a engages this shoulder 44a and is stopped in this position, and any stresses on the coupling tending to separate them axially serves to turn the key in a direction to become more firmly entrenched in its keyway 40a and to press the corresponding handle 30a with greater pressure against the corresponding stop shoulder 44a.

When the coupling is connected and locked, the two keys 23a with the teeth 20a and 21a and the spaces 22a quadrantly designed and arranged, will be on opposite sides of the coupling but will not have their centers 180° apart. However, the edges 34a and 39a respectively of the teeth 20a and 21a defining the shear planes of the two keys 23a in locking position, lie in the same diametrical axial plane, thereby achieving balance and stability against possible relative cocking action of the two coupling sections. Balance and stability against possible cocking action of the two coupling sections 10a can also be achieved if the dimensions of the teeth 20a and 21a and of the interdental spaces 22a are such as to locate the keys 23a symmetrically with their centers in the same diametrical axial plane of the coupling, when these coupling sections are locked, but to a lesser extent, since the shear plane of the two keys will lie in a plane offset from the longitudinal axis of the coupling. Such symmetry in the positions of the two keys 23a can be accomplished, if desired, by making the teeth 20a and 21a of different circumferential widths, and by making the interdental spaces 22a of correspondingly differential widths while maintaining the two coupling sections 10a identical and interchangeable.

Except as specifically described, the embodiment of FIGS. 12–15 is similar to that of FIGS. 1–10.

In all of the embodiments of the invention shown, the coupling sections are comparatively simple and interchangeable and have very few parts, these being designed for quick and easy assembly. The coupling can be connected and locked easily and quickly by simple manipulations and when so locked is safe against accidental disconnection. Moreover, the coupling is compact with no obtrusive parts which might catch or break when used, and can be disconnected even more easily and quickly.

The teeth in the two coupling sections may extend in a helical direction with a pitch varying between that shown in FIGS. 1–11 to one close to that shown in FIGS. 13–15.

While the invention has been described with particular reference to specific embodiments, it is to be understood that it is not to be limited thereto, but it is to be construed broadly and restricted solely by the scope of the appended claim.

What is claimed is:

A pipe coupling comprising a pair of connectable and disconnectable coupling sections, each having teeth spaced around the circumference of the section, the teeth of the two sections intermeshing with each tooth of one section lying between adjoining flanking teeth of the other section when the sections are brought together, one of the teeth on one of said coupling sections having a recess on one side and a key in said recess carried by the latter coupling section, a tooth of the other coupling section which mates with the recessed tooth when said sections are in mesh having a keyway on one side communicating with said recess when the sections are in mesh, said key being rotatable in said recess about a substantially radial axis, said recess having a circular wall section centered with respect to the axis of the key and said key having a circular side also centered with respect to the axis of the key and substantially coextensive in radius with said recess wall section, whereby said key is guided by said recess wall section in its rotary movement, said key also having a truncated side, said keyway being substantially in the form of a minor chordal segment of the circle of said recess wall section when said coupling sections are in mesh, whereby in one angular position of the key while said coupling sections are in mesh, said truncated side of the key will extend generally along the juncture between said two mating teeth and will clear the tooth containing the keyway to permit the coupling sections to move freely in and out of mesh, and whereby in another angular position of the key while said coupling sections are in mesh, said circular side of the key extends into the keyway to lock said coupling sections together against separation.

References Cited in the file of this patent

UNITED STATES PATENTS

| | | |
|---|---|---|
| 1,233,172 | Berry | July 10, 1917 |
| 2,033,142 | Lewis | Mar. 10, 1936 |
| 2,204,392 | Arm | June 11, 1940 |

FOREIGN PATENTS

| | | |
|---|---|---|
| 355,866 | France | Sept. 15, 1905 |